United States Patent
Chiu et al.

(10) Patent No.: US 10,833,604 B1
(45) Date of Patent: Nov. 10, 2020

(54) POWER CONVERTER DEVICE

(71) Applicant: Chicony Power Technology Co., Ltd., New Taipei (TW)

(72) Inventors: Jung-Ching Chiu, New Taipei (TW); Chien-Lung Liu, New Taipei (TW); You-Chen Kuo, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/690,144

(22) Filed: Nov. 21, 2019

(30) Foreign Application Priority Data

Oct. 2, 2019 (TW) .............................. 108135749 A

(51) Int. Cl.
*H02M 7/00* (2006.01)
*H02M 7/523* (2006.01)
*H02M 1/32* (2007.01)
*H02M 3/335* (2006.01)
*H02M 7/48* (2007.01)

(52) U.S. Cl.
CPC ............. *H02M 7/523* (2013.01); *H02M 1/32* (2013.01); *H02M 3/33507* (2013.01); *H02M 3/33569* (2013.01); *H02M 2007/4815* (2013.01)

(58) Field of Classification Search
CPC .... H02M 7/523; H02M 1/32; H02M 3/33507; H02M 3/33569; H02M 2007/4815
See application file for complete search history.

(56) References Cited

U.S. PATENT DOCUMENTS

| | | | |
|---|---|---|---|
| 8,295,068 B2 | 10/2012 | Lai et al. | |
| 9,621,056 B2 | 4/2017 | Wu et al. | |
| 2004/0208028 A1 | 10/2004 | Elek | |
| 2011/0273909 A1* | 11/2011 | Christopher | ........ H02M 3/3376 363/17 |
| 2013/0033904 A1 | 2/2013 | Ye | |

(Continued)

FOREIGN PATENT DOCUMENTS

| | | |
|---|---|---|
| CN | 103036405 A | 4/2013 |
| CN | 106374762 A | 2/2017 |

(Continued)

*Primary Examiner* — Adolf D Berhane
*Assistant Examiner* — Afework S Demisse
(74) *Attorney, Agent, or Firm* — CKC & Partners Co., LLC

(57) ABSTRACT

A power converter device includes a first phase-shift full-bridge circuit, a second phase-shift full-bridge circuit, a detector circuit, and a control circuit. The control circuit controls the first phase-shift full bridge circuit and the second phase-shift full bridge circuit. The control circuit disables the second phase-shift full-bridge circuit when the output current is less than a first predetermined value. The control circuit enables the second phase-shift full-bridge circuit when the output current is equal to or greater than the first predetermined value. The control circuit controls a synchronous switching circuit of the second phase-shift full-bridge circuit to operate in a traditional control mode when the output current is equal to or greater than a second predetermined value and a duty cycle of a phase-shift switching circuit is equal to or greater than a third predetermined value. The second predetermined value is greater than the first predetermined value.

10 Claims, 5 Drawing Sheets

(56) References Cited

U.S. PATENT DOCUMENTS

| | | | | |
|---|---|---|---|---|
| 2016/0149498 A1* | 5/2016 | Wu | ................... | H02M 3/33507 363/17 |
| 2017/0244331 A1* | 8/2017 | Guo | ................... | H02M 3/3376 |
| 2018/0301995 A1 | 10/2018 | Chang | | |

FOREIGN PATENT DOCUMENTS

| | | | |
|---|---|---|---|
| CN | 108054922 | A | 5/2018 |
| CN | 108781039 | A | 11/2018 |
| TW | I347063 | B | 8/2011 |
| TW | 201306657 | A | 2/2013 |
| TW | I495245 | B | 8/2015 |
| TW | I568161 | B | 1/2017 |
| TW | I601367 | B | 10/2017 |
| TW | M580822 | U | 7/2019 |
| WO | 2018/123767 | A1 | 7/2018 |
| WO | 2019/159663 | A1 | 8/2019 |

* cited by examiner

POWER CONVERTER DEVICE

RELATED APPLICATIONS

This application claims priority to Taiwanese Application Serial Number 108135749, filed Oct. 2, 2019, which is herein incorporated by reference.

BACKGROUND

Technical Field

The present disclosure relates to a circuit technology. More particularly, the present disclosure relates to a power converter device.

Description of Related Art

With development in the circuit technology, power converter devices have been applied to various apparatus. The power converter devices in current approaches are affected by negative factors. The negative factors are, for example, switching loss of switches, core loss, conductance loss, and negative currents. How to increase efficiency of the power converter devices is an important issue in this field.

SUMMARY

One embodiment of the present disclosure is related to a power converter device. The power converter device includes a first phase-shift full-bridge circuit, a second phase-shift full-bridge circuit, a detector circuit, and a control circuit. The first phase-shift full-bridge circuit includes a first phase-shift switching circuit and a first synchronous switching circuit. The second phase-shift full-bridge circuit and the first phase-shift full-bridge circuit are coupled in parallel. The first phase-shift full-bridge circuit includes a second phase-shift switching circuit and a second synchronous switching circuit. The second phase-shift full-bridge circuit and the first phase-shift full-bridge circuit are configured to receive an input voltage and output an output voltage. The detector circuit is configured to detect an output current. The control circuit is configured to control the first phase-shift full-bridge circuit and the second phase-shift full-bridge circuit according to the output current, the input voltage, and the output voltage. The control circuit disables the second phase-shift full-bridge circuit when the output current is less than a first predetermined value. The control circuit enables the second phase-shift full-bridge circuit when the output current is equal to or greater than the first predetermined value, such that the second phase-shift full-bridge circuit and the first phase-shift full-bridge circuit operate in a same control mode. The control circuit controls the second synchronous switching circuit to operate in a traditional mode when the output current is equal to or greater than a second predetermined value and a duty cycle of the second phase-shift switching circuit is equal to or greater than a third second phase-shift switching circuit. The second predetermined value is greater than the first predetermined value. The third predetermined value is associated with the input voltage and the output voltage.

As the above embodiments, operating efficiency of the power converter device of the present disclosure is better by multi-phases and multi-segments control.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
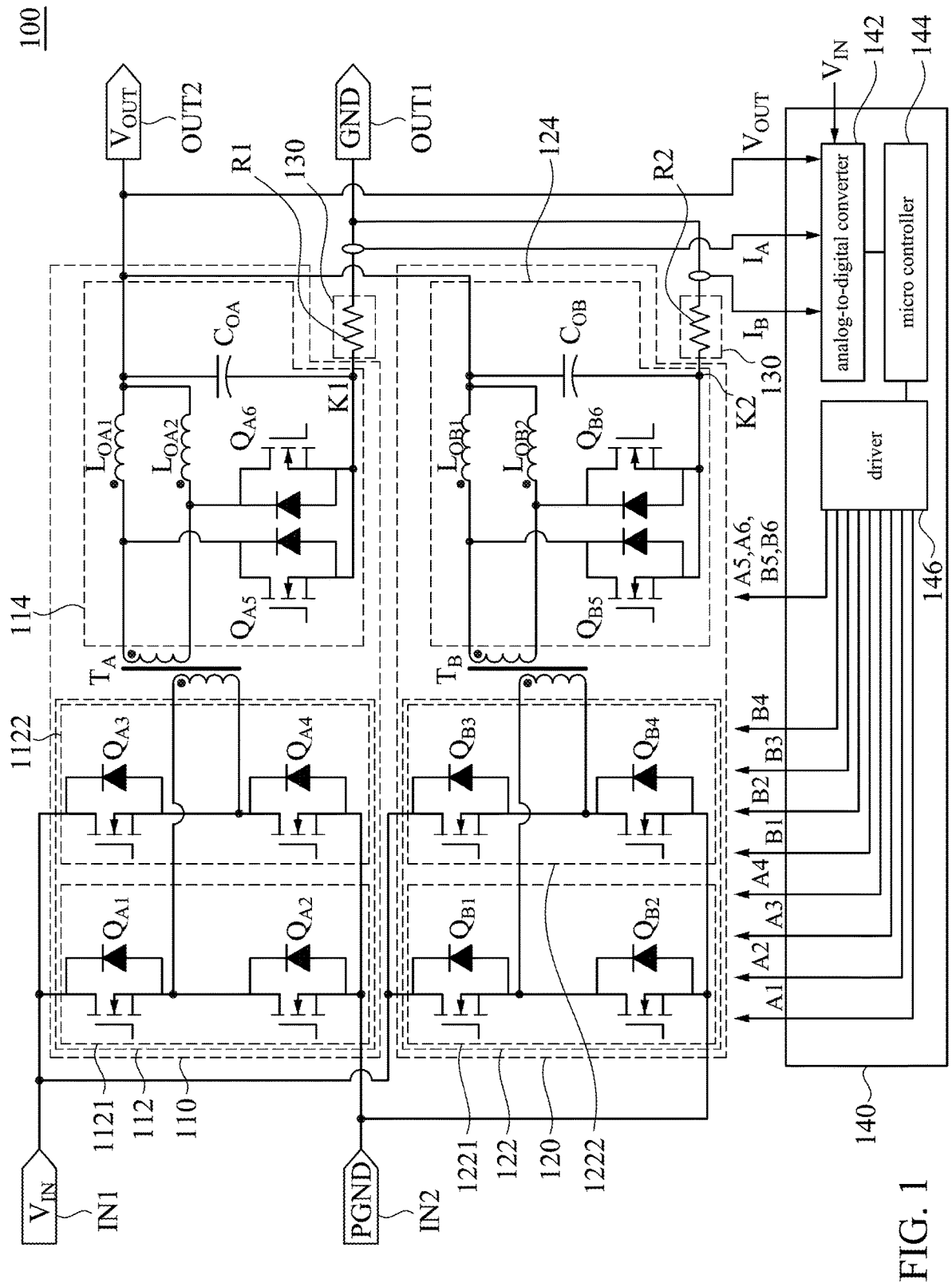
FIG. 1 is a schematic diagram illustrating a power converter device according to some embodiments of the present disclosure.

Reference is now made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

In the present disclosure, "connected" or "coupled" may be referred to "electrically connected" or "electrically coupled." "Connected" or "coupled" may also be referred to operations or actions between two or more elements.

Reference is made to FIG. 1. FIG. 1 is a schematic diagram illustrating a power converter device 100 according to some embodiments of the present disclosure. The power converter device 100 converts an input voltage $V_{IN}$ to be an output voltage $V_{OUT}$ to supply power to a load.

As illustrated in FIG. 1, the power converter device 100 includes a first phase-shift full-bridge circuit 110, a second phase-shift full-bridge circuit 120, a detector circuit 130, and a control circuit 140. The second phase-shift full-bridge circuit 120 and the first phase-shift full-bridge circuit 110 are coupled in parallel to receive the input voltage $V_{IN}$ and generate the output voltage $V_{OUT}$. The detector circuit 130 is coupled to the first phase-shift full-bridge circuit 110 and the second phase-shift full-bridge circuit 120. The control circuit 140 is coupled to the detector circuit 130, the first phase-shift full-bridge circuit 110, and the second phase-shift full-bridge circuit 120. The detector circuit 130 is configured to detect an output current. It is noted that the output current ($I_O$) described here and below is referred as a sum of a first sub output current $I_A$ of the first phase-shift full-bridge circuit 110 and a second sub output current $I_B$ of the second phase-shift full-bridge circuit 120. The control circuit 140 controls the first phase-shift full-bridge circuit 110 and the second phase-shift full-bridge circuit 120 according to the output current $I_O$, the input voltage $V_{IN}$, and the output voltage $V_{OUT}$.

The first phase-shift full-bridge circuit 110 includes a first phase-shift switching circuit 112 and a first synchronous switching circuit 114. The first phase-shift switching circuit 112 and the first synchronous switching circuit 114 are coupled magnetically via a first transformer circuit $T_A$. The first phase-shift switching circuit 112 includes a first front stage switching circuit 1121 and a first rear stage switching circuit 1122. The first front stage switching circuit 1121 and the first rear stage switching circuit 1122 are coupled in parallel between a first input terminal IN1 and a second input terminal IN2. The first input terminal IN1 is, for example, a positive voltage terminal, and the second input terminal IN2 is, for example, a ground terminal PGND (0 volt). The first front stage switching circuit 1121 includes a first switch $Q_{A1}$ and a second switch $Q_{A2}$. The first switch $Q_{A1}$ and the second switch $Q_{A2}$ are coupled in series. The first rear stage switching circuit 1122 includes a third switch $Q_{A3}$ and a fourth switch $Q_{A4}$. The third switch $Q_{A3}$ and the fourth switch $Q_{A4}$ are coupled in series. The control circuit 140 controls the first phase-shift switching circuit 112 by controlling the first switch $Q_{A1}$, the second switch $Q_{A2}$, the third switch $Q_{A3}$, and the fourth switch $Q_{A4}$.

The second phase-shift full-bridge circuit 120 includes a second phase-shift switching circuit 122, a second synchronous switching circuit 124, and a second transformer circuit $T_B$. the second phase-shift switching circuit 122 includes a second front stage switching circuit 1221 and a second rear stage switching circuit 1222. The second front stage switching circuit 1221 includes a fifth switch $Q_{B1}$ and a sixth switch $Q_{B2}$. The second rear stage switching circuit 1222 includes a seventh switch $Q_{B3}$ and an eighth switch $Q_{B4}$. A circuit structure of the second phase-shift full-bridge circuit 120 is the same to that of the first phase-shift full-bridge circuit 110, so it is not described herein again.

The first synchronous switching circuit 114 includes a ninth switch $Q_{A5}$, a tenth switch $Q_{A6}$, a first inductor $L_{OA1}$, a second inductor $L_{OA2}$, a first node K1, and a first capacitor $C_{OA}$. The ninth switch $Q_{A5}$ and the tenth switch $Q_{A6}$ are coupled at the first node K1. The first inductor $L_{OA1}$ is coupled between the ninth switch $Q_{A5}$ and a second output terminal OUT2. A first output terminal OUT1 is, for example, the ground terminal GND (0 volt), and the second output terminal OUT2 is, for example, a positive voltage terminal (12 volts). The second inductor $L_{OA2}$ is coupled between the tenth switch $Q_{A6}$ and the second output terminal OUT2. The first capacitor $C_{OA}$ is coupled between the first node K1 and the second output terminal OUT2.

The second synchronous switching circuit 124 includes an eleventh switch $Q_{B5}$, a twelfth switch $Q_{B6}$, a third inductor $L_{OB1}$, a fourth inductor $L_{OB2}$, a second node K2, and a second capacitor $C_{OB}$. A circuit structure of the second synchronous switching circuit 124 is the same to that of the first synchronous switching circuit 114, so it is not described herein again.

The detector circuit 130 includes a first detector unit R1 and a second detector unit R2. The first detector unit R1 is coupled between the first node K1 and the first output terminal OUT1. The first detector unit R1 is configured to detect the first sub output current $I_A$ of the first phase-shift full-bridge circuit 110. The second detector unit R2 is coupled between the second node K2 and the first output terminal OUT1. The second detector unit R2 is configured to detect the second sub output current $I_B$ of the second phase-shift full-bridge circuit 120.

The control circuit 140 includes an analog-to-digital converter 142, a micro controller 144, and a driver 146. In operation, the analog-to-digital converter 142 receives the first sub output current $I_A$, the second sub output current $I_B$, the input voltage $V_{IN}$, and the output voltage $V_{OUT}$, and converts the analog signals above to be digital signals. The micro controller 144 receives the digital signals and controls the driver 146 to output control signals A1-A6 and B1-B6 according to the digital signals, to control the first phase-shift full-bridge circuit 110 and the second phase-shift full-bridge circuit 120.

In specific, the power converter device 100 sets five predetermined values according to the output current $I_O$, and the control circuit 140 changes control modes according to the five predetermined values. An order of the five predetermined values from least to greatest is a predetermined value A, a predetermined value B, a predetermined value C, a predetermined value D, and a predetermined value E. The control signals A1-A4 are configured to control the first switch $Q_{A1}$ to the fourth switch $Q_{A4}$ respectively. The control signals B1-B4 are configured to control the fifth switch $Q_{BE}$ to the eighth switch $Q_{B4}$ respectively. The control signals A5-A6 are configured to control the ninth switch $Q_{A5}$ and the tenth switch $Q_{A6}$ respectively. The control signals B5-B6 are configured to control the eleventh switch $Q_{B5}$ and the twelfth switch $Q_{B6}$ respectively. The control circuit 140 controls the switches above according to the output current $I_O$, to change the control modes.

In some embodiments, the driver 146 is implemented by a pulse width modulation (PWM) driver. In these embodiments, the control signals A1-A6 and B1-B6 are pulse width modulation control signals.

Figure 2:
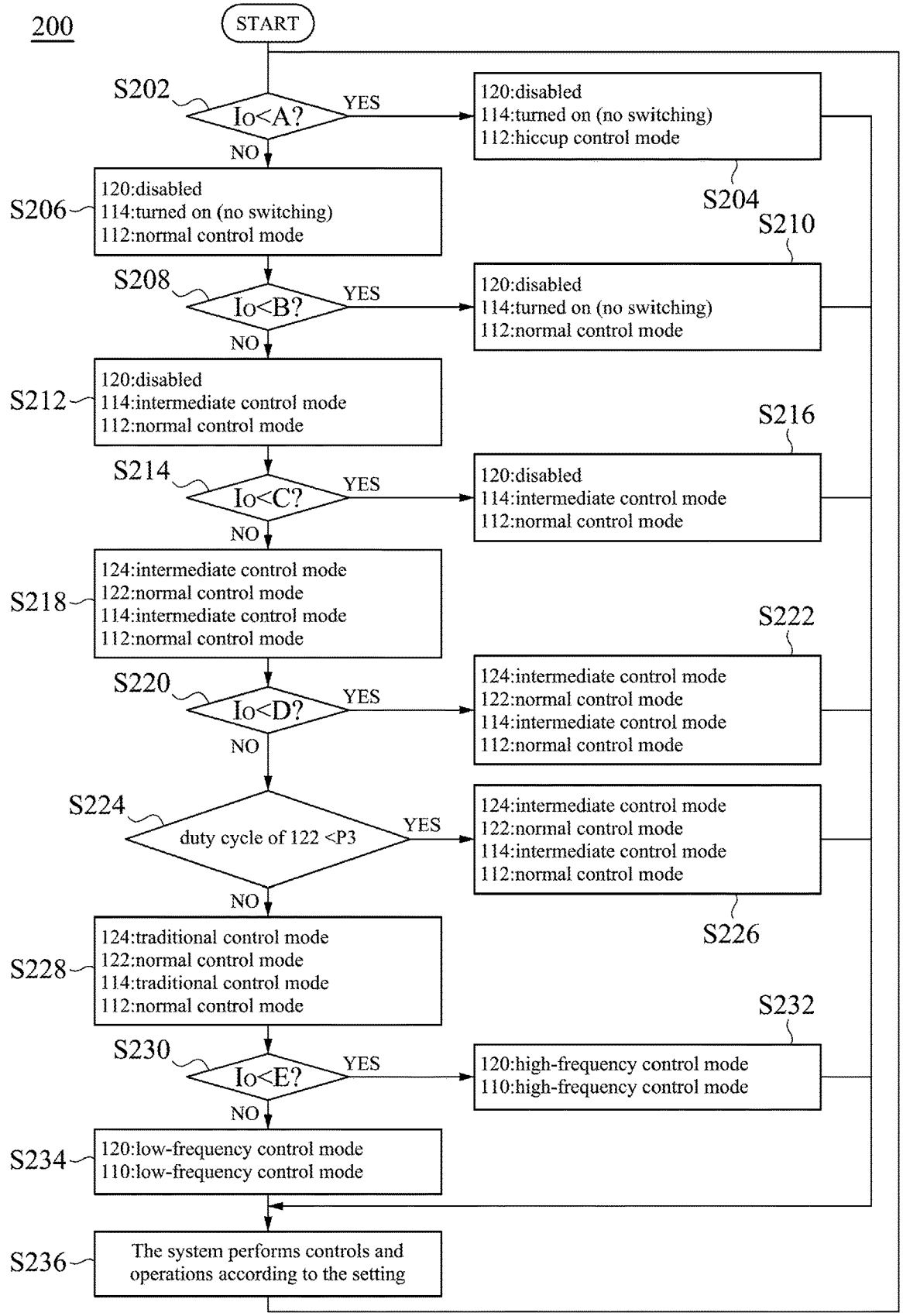
FIG. 2 is a flow diagram illustrating a control method of a power converter device according to some embodiments of the present disclosure.

Reference is made to FIG. 2. FIG. 2 is a flow diagram illustrating a control method 200 of a power converter device according to some embodiments of the present disclosure. In some embodiments, the control method 200 is applied to the power converter device 100 in FIG. 1, but the present disclosure is not limited thereto. For ease of understanding, the control method 200 is discussed with FIG. 1.

In an operation S202, the control circuit 140 determines whether the output current $I_O$ is less than the predetermined value A or not. If yes, an operation S204 is entered. If no, an operation S206 is entered.

Figure 3:
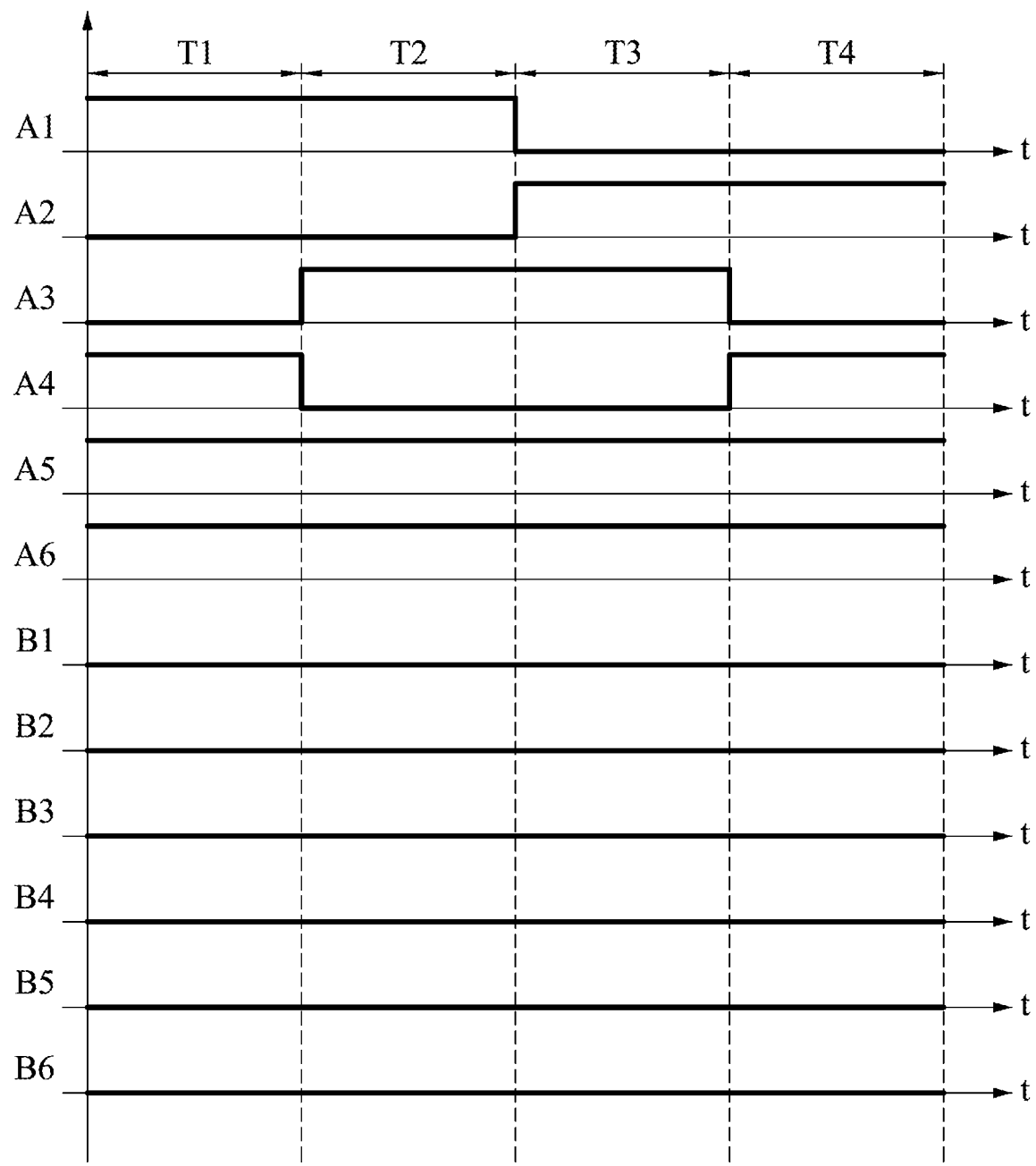
FIG. 3 is a schematic diagram illustrating waveforms of controls signals of a power converter device under a condition according to some embodiments of the present disclosure.

In the operation S204, the control circuit 140 disables the second phase-shift full-bridge circuit 120, conducts the first synchronous switching circuit 114, and controls the first phase-shift switching circuit 112 to operate in a hiccup control mode. Reference is made to FIG. 3. FIG. 3 is a schematic diagram illustrating waveforms of controls signals of the power converter device 100 under a condition (the output current $I_O$ is less than the predetermined value A) according to some embodiments of the present disclosure. As illustrated in FIG. 3, the control circuit 140 outputs the control signals B1-B6 having a low voltage level to turn off the fifth switch $Q_{B1}$ to the eighth switch $Q_{B4}$ and the eleventh switch $Q_{B5}$ to the twelfth switch $Q_{B6}$ respectively, to disable the second phase-shift full-bridge circuit 120. The control circuit 140 outputs the control signals A5-A6 having a high voltage level to turn on the ninth switch $Q_{A5}$ and the tenth switch $Q_{A6}$ respectively, and the control circuit 140 does not switch the ninth switch $Q_{A5}$ and the tenth switch $Q_{A6}$. In addition, the control circuit 140 outputs the control signals A1-A4 to switch the first switch $Q_{A1}$ to the fourth switch $Q_{A4}$ respectively, to control the first phase-shift switching circuit 112 to operate in the hiccup control mode. In specific, a working period includes a first time duration T1 to a fourth time duration T4. In the first time duration T1, the control circuit 140 outputs the control signal A1 and the control signal A4 having a high voltage level to turn on the first switch $Q_{A1}$ and the fourth switch $Q_{A4}$ respectively. At this time, the first phase-shift switching circuit 112 (primary side) charges the first synchronous switching circuit 114 (secondary side) via the first transformer circuit $T_A$. In the second time duration T2, the control circuit 140 outputs the control signal A1 and the control signal A3 having a high voltage level to turn on the first switch $Q_{A1}$ and the third switch $Q_{A3}$ respectively. At this time, the first phase-shift switching circuit 112 (primary side) operates in a current circulation (energy release) state. In the third time duration T3, the control circuit 140 outputs the control signal A2 and the control signal A3 having a high voltage level to turn on the second switch $Q_{A2}$ and the third switch $Q_{A3}$ respectively. At this time, the first phase-shift switching circuit 112 (primary side) charges the first synchronous switching circuit 114 (secondary side) via the first transformer circuit $T_A$. In the fourth time duration T4, the control circuit 140 outputs the control signal A2 and the control signal A4 having a high voltage level to turn on the second switch $Q_{A2}$ and the fourth switch $Q_{A4}$ respectively. At this time, the first phase-shift switching circuit 112 (primary side) operates in a current circulation (energy release) state. In addition, since the first phase-shift switching circuit 112 operates in the hiccup control mode, not all of the working periods include the operations above. For example, in every ten working periods, only three working periods of the working periods or a plurality of working periods required depending on the load have the operations above to switch the aforementioned switches.

In addition, voltage levels of the control signals A1-A6 and the control signals B1-B6 may be designed according to types of the aforementioned switches.

As mentioned above, the second phase-shift full-bridge circuit 120 is disabled under a condition that the output current is less than the predetermined value C, switching loss of the switches and core loss of magnetic elements of the second transformer circuit $T_B$ can be reduced, to maintain the power converter device 100 to operate at a best power point. In addition, the control circuit 140 does not switch the ninth switch $Q_{A5}$ and the tenth switch $Q_{A6}$ under a condition that the output current is less than the predetermined value B, such that the switching loss of the switches can be reduced, to increase operating efficiency.

In the operation S206, the control circuit 140 disables the second phase-shift full-bridge circuit 120, conducts the first synchronous switching circuit 114, and controls the first phase-shift switching circuit 112 to operate in a normal control mode. Main differences between the normal control mode and the aforementioned hiccup control mode are that, in the normal control mode, the switches operate as descriptions above in each of the working periods.

In an operation S208, the control circuit 140 determines whether the output current $I_O$ is less than the predetermined value B or not. If yes, an operation S210 is entered. If no, an operation S212 is entered. The control methods of the operation S210 are the same to those of the operation S206, so they are not described herein again.

Figure 4:
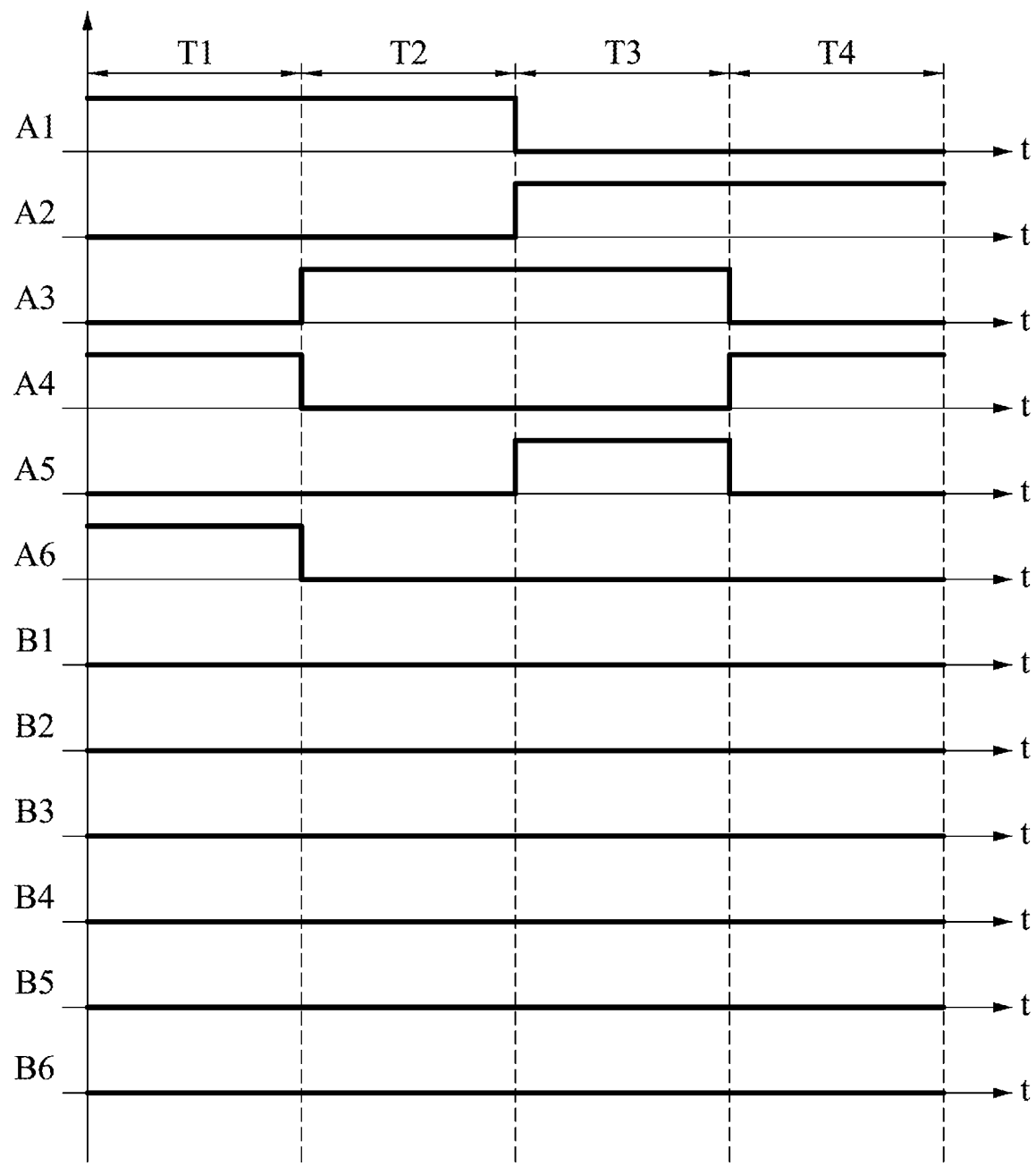
FIG. 4 is a schematic diagram illustrating waveforms of controls signals of a power converter device under a condition according to some embodiments of the present disclosure.

In the operation S212, the control circuit 140 disables the second phase-shift full-bridge circuit 120, controls the first synchronous switching circuit 114 to operate in an intermediate control mode, and controls the first phase-shift switching circuit 112 to operate in the normal control mode. Reference is made to FIG. 4. FIG. 4 is a schematic diagram illustrating waveforms of controls signals of the power converter device 100 under a condition (the output current $I_O$ is equal to or greater than the predetermined value B and less than the predetermined value C) according to some embodiments of the present disclosure. As illustrated in FIG. 4, the control circuit 140 outputs the control signals B1-B6 having a low voltage level to turn off the fifth switch $Q_{BE}$ to the eighth switch $Q_{B4}$ and the eleventh switch $Q_{B5}$ to the twelfth switch $Q_{B6}$ respectively, to disable the second phase-shift full-bridge circuit 120. The control circuit 140 controls the first synchronous switching circuit 114 to operate in the intermediate control mode. About the intermediate control mode, in specific, the control circuit 140 controls the ninth switch $Q_{A5}$ or the tenth switch $Q_{A6}$ are turned on under a condition that the first phase-shift switching circuit 112 (primary side) charges the first synchronous switching circuit 114 (secondary side). As illustrated in FIG. 4, in the first time duration T1, the control circuit 140 outputs the control signal A6 having a high voltage level to turn on the tenth switch $Q_{A6}$. In the third time duration T3, the control circuit 140 outputs the control signal A5 having a high voltage level to turn on the ninth switch $Q_{A5}$. In addition, the control circuit 140 controls the first phase-shift switching circuit 112 to operate in the normal control mode. Operations about the normal control mode are described in the paragraphs above, so they are not described herein again.

In an operation S214, the control circuit 140 determines whether the output current $I_O$ is less than the predetermined value C or not. If yes, an operation S216 is entered. If no, an operation S218 is entered. The control methods of the operation S216 are the same to those of the operation S212, so they are not described herein again.

Figure 5:
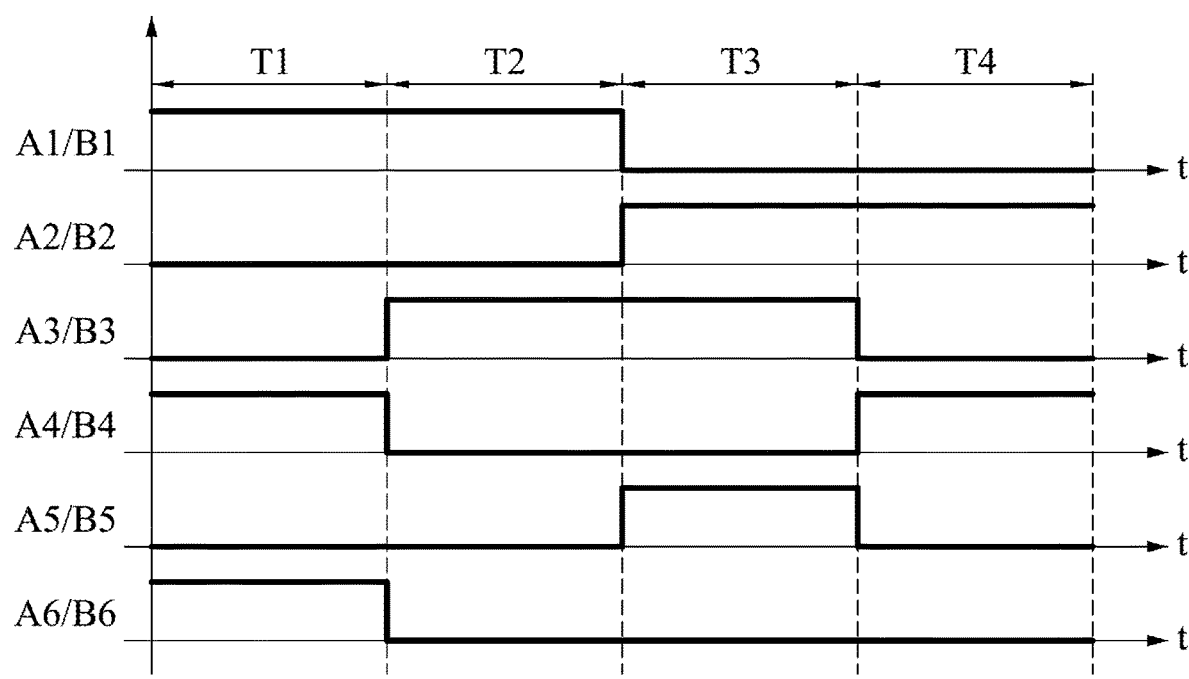
FIG. 5 is a schematic diagram illustrating waveforms of controls signals of a power converter device under a condition according to some embodiments of the present disclosure.

In an operation S218, the control circuit 140 enables the second phase-shift full-bridge circuit 120, and controls the second phase-shift full-bridge circuit 120 and the first phase-shift full-bridge circuit 110 have a same control mode. Circuit loss becomes greater when the load becomes greater, so the second phase-shift full-bridge circuit 120 is enabled to cooperate with the first phase-shift full-bridge circuit 110 to charge the load, to maintain the power converter device 100 to operate at a best power point. Reference is made to FIG. 5. FIG. 5 is a schematic diagram illustrating waveforms of controls signals of the power converter device 100 under a condition (the output current $I_O$ is equal to or greater than the predetermined value C and less than the predetermined value D) according to some embodiments of the present disclosure. As illustrated in FIG. 5, differences between FIG. 5 and FIG. 4 are that the second phase-shift full-bridge circuit 120 is started up by the control circuit 140, and the second phase-shift full-bridge circuit 120 and the first phase-shift full-bridge circuit 110 have the same control mode to share the load which is gradually increasing. As mentioned above, the circuit structure of the second phase-shift full-bridge circuit 120 is the same to that of the first phase-shift full-bridge circuit 110 (FIG. 1). In each of control modes, the elements of the second phase-shift full-bridge circuit 120 are controlled by the control circuit 140 as the elements of the first phase-shift full-bridge circuit 110. In specific, the control circuit 140 controls the first phase-shift switching circuit 112 and the second phase-shift switching circuit 122 to operate in the normal control mode, and controls the first synchronous switching circuit 114 and the second synchronous switching circuit 124 to operate in the intermediate control mode. The operations of the normal control mode and the intermediate control mode are described in paragraphs above, so that are not described herein again.

In an operation S220, the control circuit 140 determines whether the output current $I_O$ is less than the predetermined value D or not. If yes, an operation S222 is entered. If no, an operation S224 is entered. The control methods of the operation S222 are the same to those of the operation S218, so they are not described herein again.

As mentioned above, under a condition that the load is light, the first synchronous switching circuit 114 or the second synchronous switching circuit 124 is controlled in the intermediate control mode. In other words, the switches on the secondary side are turned on (the ninth switch $Q_{A5}$/the eleventh switch $Q_{B5}$ are turned on or the tenth switch $Q_{A6}$/the twelfth switch $Q_{B6}$ are turned on) when the primary side charges the secondary side (the first time duration T1 and the third time duration T3). Accordingly, an overall current of the circuit and conductance loss can be reduced to increase operating efficiency.

In the operation S224, the control circuit 140 determines whether a duty cycle of the second phase-shift switching circuit 122 is less than the predetermined value P3 or not. If yes, an operation S226 is entered. If no, an operation S228 is entered. The control methods of the operation S226 are the same to those of the operation S218, so they are not described herein again. In some embodiments, the predetermined value P3 is related to the input voltage $V_{IN}$ and the output voltage $V_{OUT}$. For example, the predetermined value can be derived by a formula (1):

$$P3 = (N1/N2) \times (V_{OUT}/V_{IN}) \quad (1)$$

P3 is a predetermined value, N1 is the number of turns of the primary side, N2 is the number of turns of the secondary side, $V_{OUT}$ is the output voltage, and $V_{IN}$ is the input voltage.

In general, for operating smoothly, duty cycles of the control signals of the second phase-shift switching circuit 122 are from smaller to larger when the second phase-shift full-bridge circuit 120 is enabled. A charging time of the second phase-shift switching circuit 122 (primary side) charging the second synchronous switching circuit 124 (secondary side) is shorter when the duty cycles of the control signals of the second phase-shift switching circuit 122 are smaller. At this time, the second phase-shift switching circuit 122 could not provide enough energy to the second synchronous switching circuit 124. If the eleventh switch $Q_{B5}$ or the twelfth switch $Q_{B6}$ is turned on at this time, negative currents of the output inductor (third inductor) $L_{OB1}$ and the output inductor (fourth inductor) $L_{OB2}$ (demagnetizations of the inductors are larger than excitation) are formed. At this time, the first phase-shift full-bridge circuit 110 not only provides energy to the load, but also provides energy to the second phase-shift full-bridge circuit 120 via a loop of the load, such that a loading suffered by the first phase-shift full-bridge circuit 110 is heavier and the first phase-shift full-bridge circuit 110 thus is damaged. Thus, it is needed to determine whether the duty cycle of the second phase-shift switching circuit 122 is less than the predetermined value P3 or not before entering the operation S228, to determine whether the second synchronous switching circuit 124 enters a traditional control mode described below or not.

Figure 6:
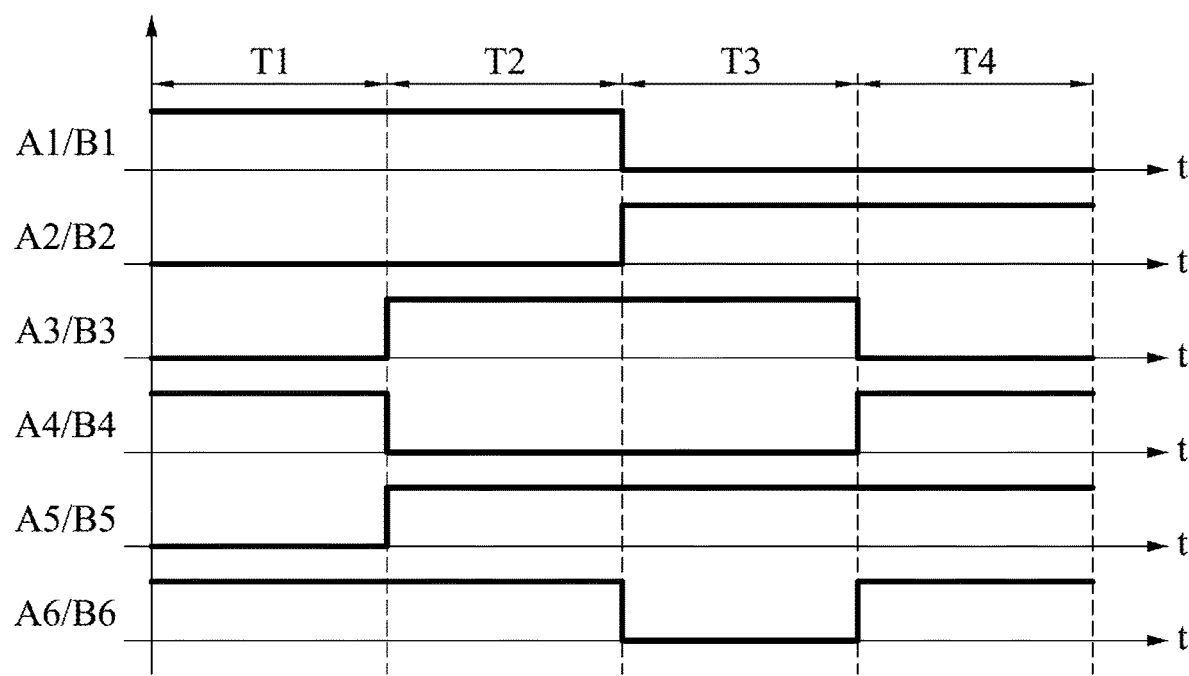
FIG. 6 is a schematic diagram illustrating waveforms of controls signals of a power converter device under a condition according to some embodiments of the present disclosure.

The operation S228 is entered if the duty cycle of the second phase-shift switching circuit 122 is greater than the predetermined value P3. In the operation S228, the control circuit 140 controls the first phase-shift switching circuit 112 and the second phase-shift switching circuit 122 to operate in the normal control mode, and controls the first synchronous switching circuit 114 and the second synchronous switching circuit 124 to operate in the traditional control mode. Reference is made to FIG. 6. FIG. 6 is a schematic diagram illustrating waveforms of controls signals of the power converter device 100 under a condition (the output current $I_O$ is equal to or greater than the predetermined value D and the duty cycle of the second phase-shift switching circuit 122 is equal to or greater than the predetermined value P3) according to some embodiments of the present disclosure. As illustrated in FIG. 6, the first phase-shift switching circuit 112 and the second phase-shift switching circuit 122 operate in the normal control mode. Operations about the normal control mode are described in paragraphs above, so they are not described herein again. A main difference between FIG. 6 and FIG. 5 is that the first synchronous switching circuit 114 and the second synchronous switching circuit 124 in FIG. 6 operate in the traditional control mode. Operations about the traditional control mode, in the first time duration T1, the control circuit 140 outputs the control signal A6 and the control signal B6 having a high voltage level to turn on the tenth switch $Q_{A6}$ and the twelfth switch $Q_{B6}$ respectively. At this time, the first phase-shift switching circuit 112 and the second phase-shift switching circuit 122 (primary side) charge the first synchronous switching circuit 114 and the second synchronous switching circuit 124 (secondary side). In the second time duration T2, the control circuit 140 outputs the control signal A5, the control signal A6, the control signal B5, and the control signal B6 having a high voltage level to turn on the ninth switch $Q_{A5}$, the tenth switch $Q_{A6}$, the eleventh switch $Q_{B5}$, and the twelfth switch $Q_{B6}$ respectively. At this time, the first synchronous switching circuit 114 and the second synchronous switching circuit 124 (secondary side) operate in a current circulation (energy release) state. In the third time duration T3, the control circuit 140 outputs the control signal A5 and the control signal B5 having a high voltage level to turn on the ninth switch $Q_{A5}$ and the eleventh switch $Q_{B5}$ respectively. At this time, the first phase-shift switching circuit 112 and the second phase-shift switching circuit 122 (primary side) charge the first synchronous switching circuit 114 and the second synchronous switching circuit 124 (secondary side). In the fourth time duration T4, the control circuit 140 outputs the control signal A5, the control signal A6, the control signal B5, and the control signal B6 having a high voltage level to turn on the ninth switch $Q_{A5}$, the tenth switch $Q_{A6}$, the eleventh switch $Q_{B5}$, and the twelfth switch $Q_{B6}$ respectively. At this time, the first synchronous switching circuit 114 and the second synchronous switching circuit 124 (secondary side) operate in a current circulation (energy release) state.

As mentioned above, in the second time duration T2 and the fourth time duration T4 (current circulation state), the ninth switch $Q_{A5}$, the tenth switch $Q_{A6}$, the eleventh switch $Q_{B5}$, and the twelfth switch $Q_{B6}$ are turned on. Thus, the current does not flow through body diodes of the switches. Accordingly, operating efficiency can be increased.

As mentioned above, the eleventh switch $Q_{B5}$ and the twelfth switch $Q_{B6}$ are turned on when the duty cycle of the second phase-shift switching circuit 122 is equal to or greater than the predetermined value P3. Thus, a current circulation formed by the second phase-shift full-bridge circuit 120 (negative current) and the first phase-shift full-bridge circuit 110 (positive current) could be prevented to ensure the circuit to operate normally.

In an operation S230, the control circuit 140 determines whether the output current $I_O$ is less than the predetermined value E or not. If yes, an operation S232 is entered. If no, an operation S234 is entered.

In the operation S232, the control circuit 140 controls the first phase-shift full-bridge circuit 110 and the second phase-shift full-bridge circuit 120 to operate in a high-frequency control mode. The current variation of the inductors on the secondary side can be reduced when switching frequencies of the switches are higher, such that core loss of iron cores of the inductors is reduced, to increase operating efficiency.

In the operation S234, the control circuit 140 controls the first phase-shift full-bridge circuit 110 and the second phase-shift full-bridge circuit 120 to operate in a low-frequency control mode. The switching loss of the switches can be prevented from being too high when the switching frequencies of the switches are lower. Accordingly, operating efficiency of the circuit can be increased and heat on the switches (transistors) can be reduced.

In an operation S236, the system (for example: a digital signal processor) performs controls and operations according to the setting above.

Time lengths of the first time duration T1, the second time duration T2, the third time duration T3, and the fourth time duration T4 in FIGS. 3-6 are only for illustration, the time lengths may be set according to a requirement. Various suitable time lengths are within contemplated scopes of the present disclosure.

As the above embodiments, the power converter device of the present disclosure selects an appropriate corresponding control mode of the control modes according to different output currents. The control modes not only include the traditional PWM control, but also integrate controls of the synchronous switches and the parallel full-bridge phase-shift circuit into the control modes. Thus, the power converter device of the present disclosure operates at a best power point, to achieve a better efficiency improvement over the traditional control mode. In addition, when the second phase-shift full-bridge circuit cooperates with the first phase-shift full-bridge circuit, a special control mode is provided to prevent an unstable condition that the output voltage oscillates.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power converter device comprising:
a first phase-shift full-bridge circuit comprising a first phase-shift switching circuit and a first synchronous switching circuit;
a second phase-shift full-bridge circuit coupled in parallel with the first phase-shift full-bridge circuit, wherein the second phase-shift full-bridge circuit comprises a second phase-shift switching circuit and a second synchronous switching circuit, wherein the second phase-shift full-bridge circuit and the first phase-shift full-bridge circuit are configured to receive an input voltage and output an output voltage;
a detector circuit configured to detect an output current; and
a control circuit configured to control the first phase-shift full-bridge circuit and the second phase-shift full-bridge circuit according to the output current, the input voltage, and the output voltage;
wherein the control circuit disables the second phase-shift full-bridge circuit when the output current is less than a first predetermined value;
wherein the control circuit enables the second phase-shift full-bridge circuit when the output current is equal to or greater than the first predetermined value, such that the second phase-shift full-bridge circuit and the first phase-shift full-bridge circuit operate in a same control mode;
wherein the control circuit controls the second synchronous switching circuit to operate in a traditional mode when the output current is equal to or greater than a second predetermined value and a duty cycle of the second phase-shift switching circuit is equal to or greater than a third predetermined value, wherein the second predetermined value is greater than the first predetermined value, wherein the third predetermined value is associated with the input voltage and the output voltage.

2. The power converter device of claim 1, wherein the control circuit controls the first phase-shift full-bridge circuit and the second phase-shift full-bridge circuit to operate in a high-frequency control mode when the output current is less than a fourth predetermined value, wherein the control circuit controls the first phase-shift full-bridge circuit and the second phase-shift full-bridge circuit to operate in a low-frequency control mode when the output current is equal to or greater than the fourth predetermined value, wherein the fourth predetermined value is greater than the second predetermined value.

3. The power converter device of claim 2, wherein the control circuit disables the second phase-shift full-bridge circuit, controls the first phase-shift switching circuit to operate in a hiccup control mode, and conducts the first synchronous switching circuit when the output current is less than a fifth predetermined value, wherein the control circuit controls the first phase-shift switching circuit to operate in a normal control mode and conducts the first synchronous switching circuit when the output current is equal to or greater than the fifth predetermined value and less than a sixth predetermined value, wherein the sixth predetermined value is greater than the fifth predetermined value and less than the first predetermined value.

4. The power converter device of claim 3, wherein the control circuit disables the second phase-shift full-bridge circuit, controls the first phase-shift switching circuit to operate in the normal control mode, and controls the first synchronous switching circuit to operate in an intermediate control mode when the output current is equal to or greater than the sixth predetermined value and less than the first predetermined value.

5. The power converter device of claim 4, wherein the first phase-shift switching circuit comprises:
a first front stage switching circuit comprising a first switch and a second switch, wherein the first switch and the second switch are coupled in series; and
a first rear stage switching circuit comprising a third switch and a fourth switch, wherein the third switch and the fourth switch are coupled in series;

wherein the first front stage switching circuit and the first rear stage switching circuit are coupled in parallel between a first input terminal and a second input terminal;

wherein the control circuit controls the first phase-shift switching circuit by controlling the first switch, the second switch, the third switch, and the fourth switch.

6. The power converter device of claim 5, wherein the second phase-shift switching circuit comprises:
   a second front stage switching circuit comprising a fifth switch and a sixth switch, wherein the fifth switch and the sixth switch are coupled in series; and
   a second rear stage switching circuit comprising a seventh switch and an eighth switch, wherein the seventh switch and the eighth switch are coupled in series;
   wherein the second front stage switching circuit and the second rear stage switching circuit are coupled in parallel between the first input terminal and the second input terminal;
   wherein the control circuit controls the second phase-shift switching circuit by controlling the fifth switch, the sixth switch, the seventh switch, and the eighth switch.

7. The power converter device of claim 6, wherein the first synchronous switching circuit comprises:
   a ninth switch;
   a tenth switch coupled with the ninth switch at a first node, wherein the detector circuit is coupled between the first node and a first output terminal;
   a first inductor coupled between the ninth switch and a second output terminal; and
   a second inductor coupled between the tenth switch and the second output terminal.

8. The power converter device of claim 7, wherein controlling the first synchronous switching circuit to operate in the intermediate control mode comprises:
   in a first time duration, controlling the first switch, the fourth switch, and the tenth switch to be turned on, and controlling the second switch, the third switch, and the ninth switch to be turned off;
   in a second time duration, controlling the first switch and the third switch to be turned on, and controlling the second switch, the fourth switch, the ninth switch, and the tenth switch to be turned off;
   in a third time duration, controlling the second switch, the third switch, and the ninth switch to be turned on, and controlling the first switch, the fourth switch, and the tenth switch to be turned off; and
   in a fourth time duration, controlling the second switch and the fourth switch to be turned on, and controlling the first switch, the third switch, the ninth switch, and the tenth switch to be turned off.

9. The power converter device of claim 7, wherein the second synchronous switching circuit comprises:
   an eleventh switch;
   a twelfth switch coupled with the eleventh switch at a second node, wherein the detector circuit is coupled between the second node and the first output terminal;
   a third inductor coupled between the eleventh switch and the second output terminal; and
   a fourth inductor coupled between the twelfth switch and the second output terminal.

10. The power converter device of claim 9, wherein the detector circuit comprises:
    a first detector unit coupled between the first node and the first output terminal, wherein the first detector unit is configured to detect a first sub output current of the first phase-shift full-bridge circuit; and
    a second detector unit coupled between the second node and the first output terminal, wherein the second detector unit is configured to detect a second sub output current of the second phase-shift full-bridge circuit, wherein a sum of the first sub output current and the second sub output current is the output current.

\* \* \* \* \*